(12) United States Patent
Yusa et al.

(10) Patent No.: US 7,597,829 B2
(45) Date of Patent: Oct. 6, 2009

(54) INJECTION MOLDING METHOD AND APPARATUS

(75) Inventors: Atsushi Yusa, Ibaraki (JP); Terumasa Kondo, Nagano (JP); Toshiyuki Tomita, Matsudo (JP); Masami Suzuki, Matsudo (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 806 days.

(21) Appl. No.: 11/020,137

(22) Filed: Dec. 27, 2004

(65) Prior Publication Data
US 2005/0205492 A1    Sep. 22, 2005

(30) Foreign Application Priority Data
Dec. 26, 2003    (JP)    ............................. 2003-432141

(51) Int. Cl.
*B29C 45/04* (2006.01)
*B29C 45/34* (2006.01)

(52) U.S. Cl. ........................................ 264/85

(58) Field of Classification Search ................. None
See application file for complete search history.

(56) References Cited
U.S. PATENT DOCUMENTS
6,955,781 B2 * 10/2005 Yusa et al. ................. 264/162

* cited by examiner

*Primary Examiner*—Monica A Huson
(74) *Attorney, Agent, or Firm*—Birch, Stewart, Kolasch & Birch, LLP

(57) ABSTRACT

An injection molding method that modifies a surface of thermoplastic resin using a supercritical fluid that contains a solute, and molds the thermoplastic resin, includes the steps of injecting the thermoplastic resin into a mold cavity in a mold, a space being formed between the mold cavity and the surface of the thermoplastic resin, introducing into the space the supercritical fluid that contains the solute, and exhausting from the space the supercritical fluid that contains the solute.

7 Claims, 5 Drawing Sheets

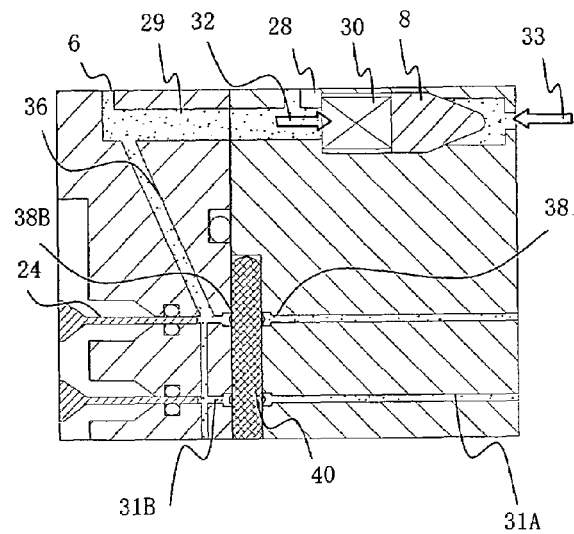
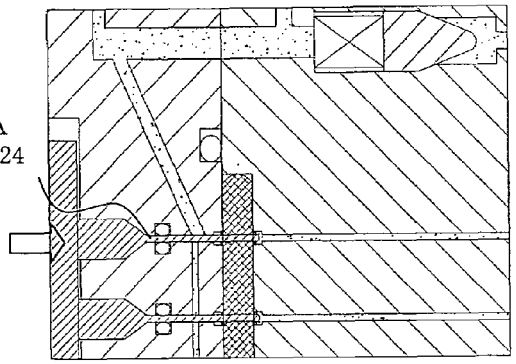
FIG. 4A
FIG. 4B
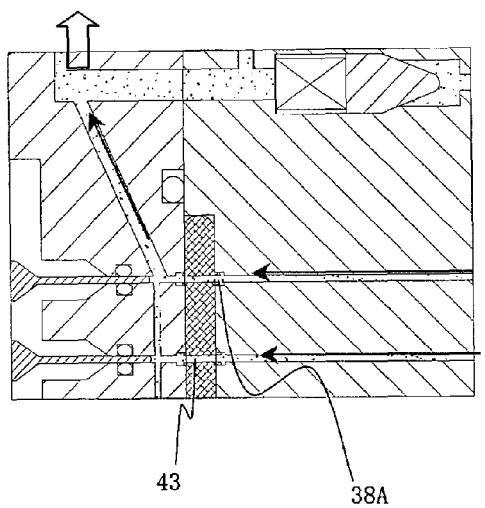
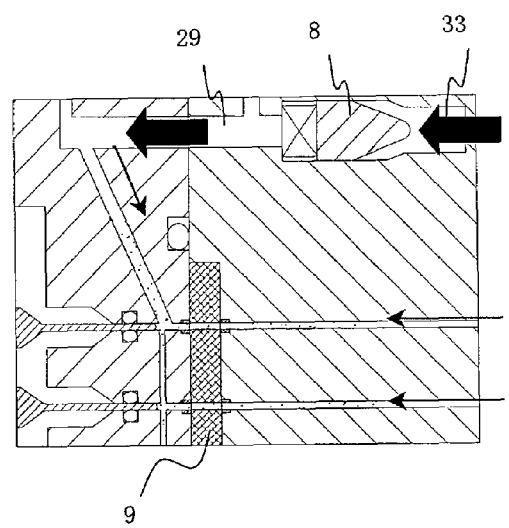
FIG. 4C
FIG. 4D

INJECTION MOLDING METHOD AND APPARATUS

This application claims the right of priority under 35 U.S.C. §119 based on Japanese Patent Application No. 2003-432141, filed on Dec. 26, 2004, which is hereby incorporated by reference herein in its entirety as if fully set forth herein.

BACKGROUND OF THE INVENTION

The present invention relates generally to methods and apparatuses for manufacturing the molded articles, and more particularly to a method for modifying a surface of thermoplastic resin (or molten resin) using the supercritical fluid, and an injection molding method using the method.

Various processes have recently been proposed which apply the supercritical fluid to resin molding processing. The supercritical fluid is a unique medium that has a solvent characteristic close to the liquid and has such permeability as the gas. For example, one proposed method improves the flow properties and transfer performance of the resin at the time of injection molding by using the supercritical fluid and compressed $CO_2$ that permeate into the thermoplastic resin, serve as a plasticizer, and lower the viscosity of the resin (see, for example, Japanese Patent Application No. 10-128783). The method disclosed in Japanese Patent Application No. 10-128783 previously fills the inert gas at a high-pressure state, such as $CO_2$, in a mold cavity, and then fills the molten resin in the cavity through injection. As a result, the high-pressure gas permeates in the surface from the flow front part of the resin at the time of flowing due to the fountain effect. This method is referred to as a counter pressure method, which is a technique that restrains a growth of a skin layer on the mold surface as an obstacle of the flow and transfer. The pressurized inert gas is used as a counter pressure.

Another proposed method opens, after the resin is filled in a mold cavity, a mold to form an aperture between a mold transfer surface and the resin, injects the $CO_2$ gas, such as supercritical fluid into the aperture, and softens the resin surface. See, for example, Japanese Patent No. 3,445,778. The method disclosed in Japanese Patent No. 3,445,778 is different from the counter pressure method and referred to as a core back method for opening a mold core that restricts the mold cavity after the filling and for injecting $CO_2$.

A still another proposed surface modification molding method develops the above method by utilizing the solvent characteristic of the supercritical fluid (see, for example, Japanese Patent Application, Publication No. 2003-320556). The method disclosed in Japanese Patent Application, Publication No. 2003-320556 uses the compressed gas, such as supercritical $CO_2$, which has solubility to the molten resin to be injected. The method injects into the mold cavity the compressed gas as a counter pressure in which a modifier dissolves or disperses, then injects the molten resin into the mold cavity, and obtains the molded article having a modifier modified surface.

However, the earnest researches by the instant inventors have discovered that the above surface modification injection molding method that uses the supercritical fluid has the following various problems and is hard to commercialize: The supercritical $CO_2$ has a solvent characteristic similar to that of n-hexane and the solvent's solubility too low for the injection molding process even if the entrainer (or assistant) is used. In other words, the concentration of the functional agent as solute is much lower than the concentration of the compressed gas, such as $CO_2$, in the resin. The functional agent permeates only by a small amount from the surface in a short-time contact between the supercritical fluid and the resin as in the counter pressure method and the core back method. While the entire resin surface which the compressed gas contacts becomes soft, it is found that the functional agent does not exhibit an intended function. In other words, the methods in the above prior art references that touches the supercritical fluid and the compressed inert gas to the resin in the mold cannot control the contact time period between the resin and the supercritical fluid and the compressed inert gas, and cannot sufficiently modify the surface.

In addition, the methods in the above prior art references introduce the supercritical fluid that has a certain pressure condition outside the mold and dissolves the solute at that pressure at the saturated solubility, into the mold cavity at the ambient pressure and touches the solute to the resin, inevitably causing the rapid decompression. There is a strong correlation between the supercritical fluid's pressure and the solute's solubility. The rapid decompression remarkably lowers the solubility and the solute separates out. While the pressure returns quickly, the solute once separating out does not immediately dissolve again, causing clogs in a channel in the mold. This problem also makes it difficult to recover and recycle the functional agent. The rapid decompression phenomenon when the supercritical fluid is introduced into the mold is conspicuous in the surface modification molding that needs dissolve the solute, although the phenomenon merely causes the volume expansion with respect to the inert gas, such as $CO_2$, itself.

When the functional material uses the organic metallic complex and is applied to the electroless plating processing, a method that uses the heat etc. to precipitate fine metallic particles is inefficient. In addition, the functional material is unlikely to serve as catalyst cores of the fine metallic particles that have permeated in the resin.

BRIEF SUMMARY OF THE INVENTION

Accordingly, with the foregoing in mind, it is a first exemplified object of the present invention to provide an injection molding method, which modifies a surface of the thermoplastic resin using the supercritical fluid as a solvent, such as supercritical $CO_2$, molds the thermoplastic resin through injection molding, and provides a resin surface with a high function.

A second exemplified object of the present invention is to provide a method that infiltrates organic metallic complex as a functional agent into the resin surface at the time of resin molding for electroless plating etc., disconnects a ligand from the metallic complex (in the reduction process), and precipitates fine metallic particles at a high reduction efficiency and with a small loss of the functional agent.

It is found that the way of recovering and recycling the solute that has introduced into the mold but not permeated into the resin is a vital issue for a surface modification injection molding method that uses the supercritical fluid as the solvent. Unless this issue is solved, a channel etc. would clog in the mold and stable and continuous productions of the resin-molded articles would become difficult and increase the manufacture cost.

Therefore, a third exemplified object of the present invention is to provide a method to recover from the mold and recycle the surplus solute contained in the supercritical fluid in order to infiltrate the solute in the resin and modify a resin surface using the supercritical fluid as a solvent, such as $CO_2$.

An injection molding method according to one aspect of the present invention that modifies a surface of thermoplastic resin using a supercritical fluid that contains a solute, and molds the thermoplastic resin, includes the steps of injecting the thermoplastic resin into a mold cavity in a mold so as to form a space between the mold cavity and the surface of the thermoplastic resin, introducing into the space the supercritical fluid that contains the solute, and exhausting from the space the supercritical fluid that contains the solute.

A type of the thermoplastic resin is not limited, and the thermoplastic resin may include at least one of polycarbonate, polymethyl-methacrylate, poly(ether-imid), polymethyl pentene, amorphous polyolefin, polytetrafluoro-ethylene, liquid crystal polymer, styrene resin, polymethyl pentene, polyacetal, etc. Of course, the thermoplastic resin may use a combination of plural types, and polymer alloy that contains at least one of them as a main component, and add various types of fillers.

The usable supercritical fluid may arbitrarily include air, $CO_2$, butane, pentane, methanol, and other fluids, but preferably uses $CO_2$ because it serves as a plasticizer to certain thermoplastic resin materials and is famous for high performance in injection molding and extrusion molding. The supercritical $CO_2$ may contain an entrainer or well-known assistant for improved solubility, such as acetone, methanol, ethanol, propanol or other alcohols.

Since the supercritical fluid contains the solute and the introducing and exhausting steps introduce a new supercritical fluid and a solute into the thermoplastic resin surface one after another, a flesh supercritical fluid and a solute always contact the thermoplastic resin surface. The repetitive flow or flow and residence of the supercritical fluid and solute contacting the thermoplastic resin infiltrate the solute having low solubility into the resin surface at a high concentration.

The condition under which the solute is dissolved in the supercritical fluid is arbitrary. For example, $CO_2$ has thresholds for the supercritical state of the pressure of about 7 MPa or greater and the temperature of about 31° C. or greater, and thus needs a temperature range of 35° C. and 60° C. and a preferable pressure range of 10 MPa and 25 MPa. When the temperature exceeds the temperature of 60° C. or the pressure of 25 MPa, the sealing performance and control over the valve action become difficult. On the other hand, when the temperature and the pressure are below this range, the solute exhibits the unstable solubility.

A method for forming the space, other than the above core back method, can provide the mold and stamper with fine concaves having a high aspect ratio and control the molding condition, such as a mold's temperature so that the primarily filled resin does not fully penetrate through the concaves. In introducing in the space the supercritical fluid and the solute that dissolves in it, the solute that dissolves in the supercritical fluid outside the mold is introduced into the mold at an arbitrary timing.

It is preferable to fill only the supercritical fluid in the space before the supercritical fluid and the solute that dissolves in it are introduced into the space. This can maintain the pressure loss as small as possible at the time of introduction of the supercritical fluid and the solute. Control over the flow of the exhausted supercritical fluid enables the supercritical fluid to flow and restrains the pressure loss at the time of flow in the mold, thereby infiltrating a larger amount of solute into the resin through the resin surface that contacts the supercritical fluid.

The solute contained in the supercritical fluid can arbitrarily use organic matters and inorganic materials modified by organic compounds, which have solubility to some extent to the supercritical fluid, such as supercritical $CO_2$. The latter example includes, for instance, a metal alkoxide, an organic metallic complex, etc. Use of azoic or other dyes, fluorescent dye, organic coloring matter materials, such as phtalocyanine for the solute, for instance, would dye the surface at the molding time and form an organic recording film. Polyethylene glycol, polypropylene glycol, etc. can provide a hydrophilic nature. Use of a hydrophobic UV stabilizer, such as benzophenone and coumarine, would improve the tensile strength after aeration. Use of a fluorine compound, such as a fluorinatedorganic copper complex, would improve the frictional performance and the water repellency.

Nevertheless, the solute preferably is an organic metallic complex. The solute as the organic metallic complex can infiltrate the organic metallic complex and its modification near the surface of the molded article made of the thermoplastic resin, providing the resin with electrical conductivity, and forming catalyst cores for subsequent electroless plating. A type of the organic metallic complex is arbitrary, and the organic metallic complex may include dimethyl platinum (cyclooctadiene) (II), bis(cyclopentadienyl) nickel, bis (acetylacetnate) paradium (II), etc.

When the injection molding method further includes the step of filling the thermoplastic resin in the space, the molded article that fills the space with the resin can be obtained by completely adhering the entire mold surface after the solute is infiltrated into the resin surface through the space. A method for completely adhering the resin to the mold surface may be arbitrary: For example, it may be a method for increasing the dwell pressure from the screw in the heating cylinder, a method for increasing the clamping pressure, a method for closing and compressing the cavity, etc.

An injection molding method according to another aspect of the present invention that modifies a surface of thermoplastic resin using a supercritical fluid that contains an organic metallic complex, and molds the thermoplastic resin, includes the steps of injecting the thermoplastic resin into a mold cavity in a mold, a space being formed between the mold cavity and the surface of the thermoplastic resin, introducing into the space the supercritical fluid that contains the organic metallic complex, and reducing the organic metallic complex in the space.

The reducing step may introduce into the space inert gas having a temperature higher than a reduction temperature of the organic metallic complex. The inert gas may be nitrogen. This feature efficiently reduces the organic metallic complex. The efficient reduction of the organic metallic complex that has permeated in the resin without a posttreatment precipitates the necessary and sufficient amount of catalyst cores for the subsequent electroless plating, and thereby forms a good electroless-plated membrane.

The reducing step may introduce into the space supercritical fluid that contains a reducer for reducing the organic metallic complex. This feature efficiently reduces the organic metallic complex. The efficient reduction of the organic metallic complex that has permeated in the resin without the posttreatment precipitates the necessary and sufficient amount of catalyst cores for the subsequent electroless plating, and thereby forms a good electroless-plated membrane.

A molded article is manufactured by the above injection molding method, and includes a metal membrane formed by plating, such as an immersion in the electroless plating solution, at a portion on a surface modified by the supercritical fluid that contains the solute. The plating is arbitrary, and may apply Cu, Ni, Ag and Au plating, etc.

An injection molding apparatus according to another aspect of the present invention includes a resin injecting part that injects thermoplastic rein into a mold cavity in a mold, a space being formed between the mold cavity and a surface of the thermoplastic resin, a supercritical fluid introducing unit that introduces into the space supercritical fluid that contains solute, and a supercritical fluid exhausting unit that exhausts, from the space, the supercritical fluid that contains the solute. The injection molding apparatus may further include a mold controller that moves the mold so as to form the space.

As the injection molding apparatus includes a supercritical fluid introducing unit and a supercritical fluid exhausting unit separately, flesh supercritical fluid and solute can always contact the thermoplastic resin surface, enhancing a surface modification effect.

When the space is selectively and partially formed above the surface of the thermoplastic resin, the electrical conductivity and catalyst cores for the electroless plating can be formed only at selective part on the resin surface. This feature is convenient to a wiring pattern formation, etc.

The above injection molding method may further include the steps of recovering the supercritical fluid that contains the solute, which has been exhausted by the exhausting step, and recycling the supercritical fluid that contains the solute, which has been recovered, for the introducing step. Also, the injection molding apparatus may further include a supercritical fluid recovery unit that recovers the supercritical fluid that contains the solute, which has been exhausted; and a recycling mechanism that sets an internal pressure in the supercritical fluid recovery unit higher than an internal pressure in the supercritical fluid introducing unit, and supplies the supercritical fluid that contains the solute, which have been recovered, to the supercritical fluid introducing unit.

Other objects and further features of the present invention will become readily apparent from the following description of preferred embodiments with reference to accompanying drawings.

BRIEF DESCRIPTION OF THE DRAWINGS

FIG. 4 is a sectional view of a principal part around a mold cavity of the molding apparatus shown in FIG. 3.

DETAILED DESCRIPTION OF THE PREFERRED EMBODIMENTS

Figure 1:
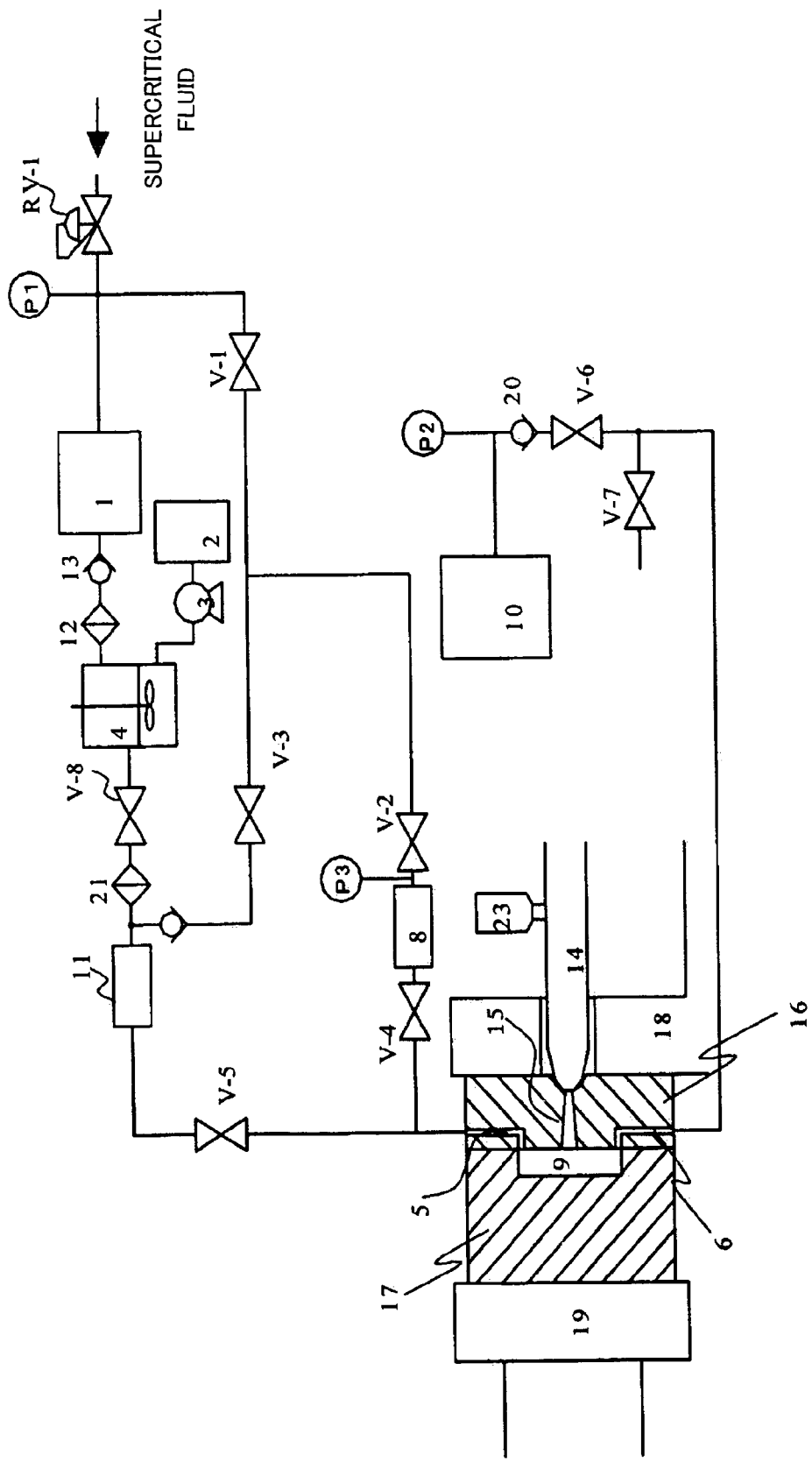
FIG. 1 is a schematic block diagram of principal part of a mold and an injection molding apparatus for implementing an injection molding method according to a first embodiment of the present invention.
Figure 2:
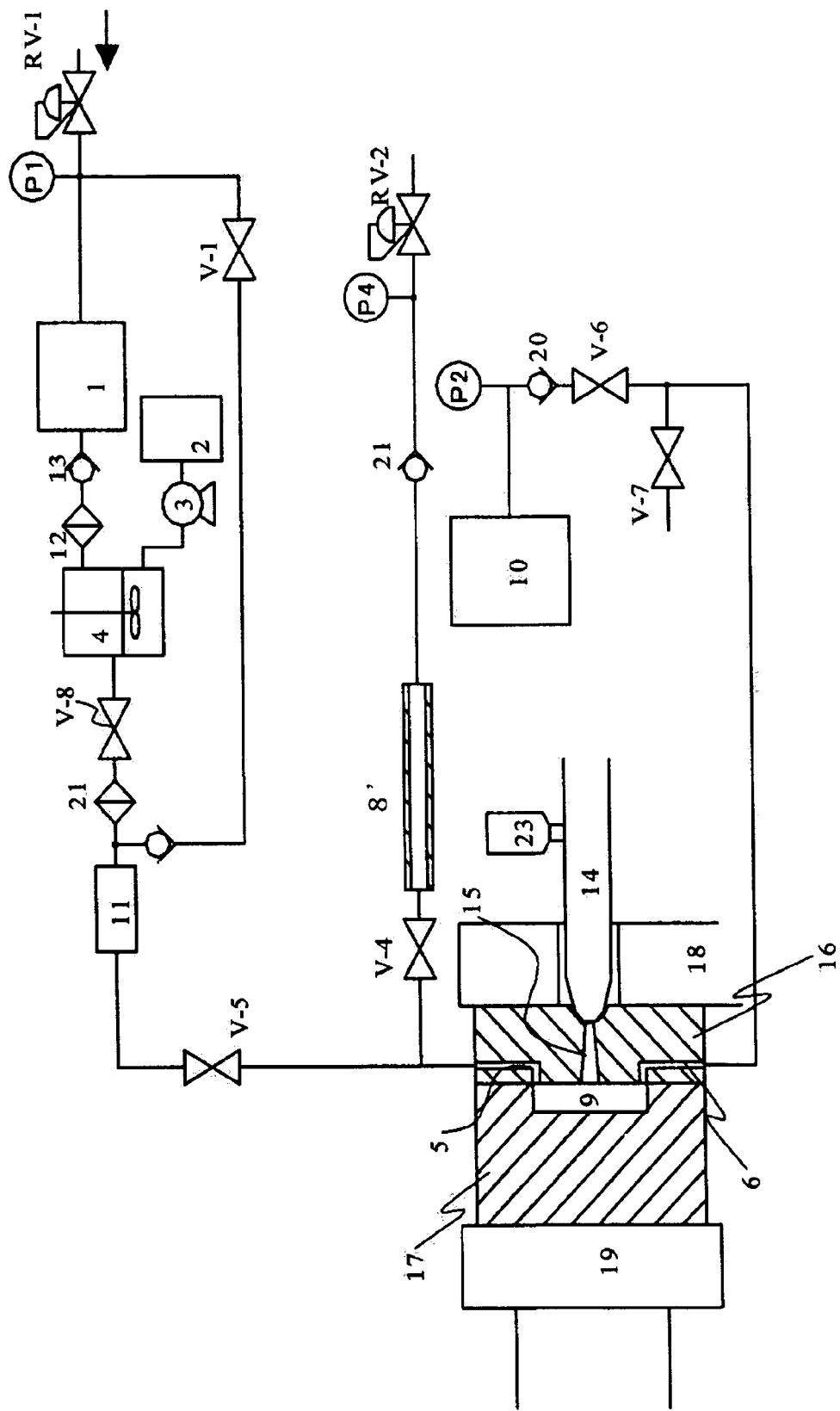
FIG. 2 is a schematic block diagram of principal part of a mold and an injection molding apparatus for implementing an injection molding method according to a third embodiment of the present invention.

Referring to the accompanying drawings, a description will be given of the mold and molding apparatus for implementing an injection molding method according to one embodiment of the present invention. FIGS. 1 and 2 are schematic block diagrams of principal parts of the mold and molding apparatus. In the instant embodiment, the molding apparatus utilizes a known injection molding apparatus, and provides motorized clamping and injections.

The mold includes a fixed mold 16 and a movable mold 17, and the parting line is sealed by an O-ring (not shown). The fixed mold 16 is attached to a fixed platen 18, and the movable mold 17 is attached to a movable platen 19.

The thermoplastic resin in a resin pellet, which is dried and deaerated by a drier (not shown) and automatically supplemented to a hopper 23, is plasticization-metered by a screw (not shown) in a plasticization cylinder 14, and then is filled in the mold cavity 9. A toggle type clamping machine (not shown) arranged behind the movable platen 19 provides clamping. A clamping feedback mechanism can open the parting line with precision of 10 µm as a joint surface between the molds at an arbitrary timing.

A type of the supercritical fluid used for the present invention is arbitrary as long as it is a fluid that has solubility to some extent to an organic material, but this embodiment uses the supercritical $CO_2$. A type of solute is arbitrary, but this embodiment uses bis(acetylacetnate) paradium as Pd complex.

Any method may be used to dissolve the solute in the supercritical fluid, but this embodiment regulates, via a decompression valve RV-1 down to 20 MPa, the supercritical $CO_2$ having a temperature of 50° C. and a pressure 25 MPa, supplied from a supercritical fluid generator (not shown), then mixes it with the metallic complex as solute in a mixing tank 1, and dissolves the metallic complex into the supercritical fluid. Then, ethanol as an entrainer is agitated with and dissolved in the mixture in an agitator sink 4, after the mixture passes through a check valve 13 and a sintered filter 12. A feedback controller uses a liquid level sensor provided to the agitator sink 4, drives a entrainer pump 3 so that the ethanol is always supersaturated in the agitator sink 4, and supplements the entrainer stored in an entrainer tank 2 to the agitator sink 4.

While the present invention may use any types of thermoplastic resin, this embodiment uses polycarbonate resin (GE Plastics, Lexan) having a glass transition temperature Tg of 150° C. The molding condition for the present invention is arbitrary, but this embodiment sets the temperature of the plasticization cylinder 14 to 320° C. and the temperature of the cavity to 100° C. The injection speed is 250 mm/s, and the resin is primarily filled at 0.2 s in a mold cavity 9 having a disc shape with a diameter of Φ120 mm through a spool 15.

First Embodiment

FIG. 1 is a schematic block diagram of the principal part of the mold and the injection molding apparatus for implementing an injection molding method according to a first embodiment of the present invention. An arbitrary method for introducing the supercritical $CO_2$ and the solute that dissolves in it into the resin surface can be used after the filling to the mold cavity 9. This embodiment uses a release action of an automatic valve V5 that drives the supercritical fluid and solute once filled in a reserve tank 11 using an electromagnetic valve. The supercritical $CO_2$ and solute are introduced to the fixed mold 16 by an introduction port 5 in the fixed mold 16 as a supercritical fluid introducing unit.

While an arbitrary method may be used to introduce the supercritical $CO_2$ between the fixed mold 16 and the resin, this embodiment opens the movable mold 17 and forms an introduction space of 20 µm between the fixed mold 16 and the filled resin just after the filling. This molding apparatus provides feedback control over the clamping force so as to make the opening amount constant even when the high-pressure supercritical $CO_2$ flows in the space.

Next, a release of the automatic valve 5 introduces into the introduction space the supercritical $CO_2$ and solute that have been filled in the reserve tank 11 at the pressure of 20 MPa by a temporary release of a valve V-8. At the same time, the valves V1 and V-3 open while the valve V-8 closes, so as to continuously introduce the supercritical fluid with no solute that passes the reserve tank 11. This action can sufficiently increase the amount of the supercritical $CO_2$ relative to the solute, and restrains the supersaturation and precipitation of the solute due to the pressure loss when the supercritical fluid flows. Next, the valves V-3 again closes and the valve V-8 opens, and the supercritical $CO_2$ in which the solute dissolves is again introduced.

Thus, introductions of the supercritical $CO_2$ in which the solute dissolves and the supercritical $CO_2$ in which no solute dissolves are alternately repeated 10 times for 60 seconds.

In this embodiment, the supercritical $CO_2$ and the solute that dissolves in it flows or flows and resides in the space between the surface of the mold cavity 9 and the resin surface. After the supercritical fluid is introduced from the introduction port 5, a release of the valve V-6 forms a flow to the space by exhausting the supercritical fluid from the mold through the exhaust port 6 as a supercritical fluid exhausting unit. The alternate flow and residence of the supercritical fluid iterate by repetitive closing and opening actions of the valve V-6, and a recovery tank 10 recovers the supercritical fluid and the solute after they pass a check valve 20 while the pressure loss is maintained as low as possible. At the flow time, the pressure P2 is increased to about 5 to 10 Pa. A relief valve may be provided to restrain the pressure rise in the recovery tank 10.

The above flow action repeats for 60 seconds, and then the valve V-8 closes and the valves V-1 and V-3 open for 10 seconds. Thereby, the supercritical $CO_2$ flows in which no solute dissolves flows in the same channel as that for the supercritical $CO_2$ flows in which the solute dissolves. This action can almost completely recovers in the recovery tank 10 the solute that resides in the pipe. When the valves V-4, V-5 and V-6 close and the valve V-7 opens, $CO_2$ that resides in the mold cavity 9 is gasified and released to the air. When a XPS measures a surface of the resin-molded article by this molding apparatus, peaks of Pd metallic complex and Pd fine particles are confirmed.

It is confirmed that both Pd metallic complex and Pd fine particles from which a legand is disengaged exist on the molded article surface. When a reduction ratio is defined as an existing ratio of the metallic fine particles that effectively serve as metallic cores in the electroless plating relative to the entire compound derived from the organic metallic compound, the reduction ratio of the Pd complex is 40% in this embodiment. While the posttreatment, such as heating and reduction reaction, may follow after the supercritical fluid dissolved matter, such as a metallic complex, is orientated on the molded article's surface by the above method, this embodiment does not perform the posttreatment until the electroless plating.

The instant embodiment uses electroless copper plating for the molded article manufactured by the above injection molding method. Initially, the molded article is put in a container that contains electroless copper plating solution, i.e., Okuno Chemical Industries Co., Ltd., OPC700A of 100 ml/l+Okuno Chemical Industries Co., Ltd., OPC700B of 100 ml/l, and agitated for 60 minutes at room temperature for copper plating processing. After cleansed, it is put in a container that contains electroless copper plating solution, i.e., Okuno Chemical Industries Co., Ltd., OPC Copper T1 of 60 ml/l+Okuno Chemical Industries Co., Ltd., OPC Copper T2 of 12 ml/l+Okuno Chemical Industries Co., Ltd., OPC Copper T3 of 100 ml/l, and agitated for 120 minutes at temperature of 60° C. followed by copper plating processing. After it is cleansed with supersonic waves, pure water and methanol, the copper plated film is formed with a thickness of 10 μm on the entire surface of the molded article. It is confirmed that the copper plated coating has a uniform thickness without swell, and exhibits practically satisfactory adhesive strength in a peel test.

Second Embodiment

A second embodiment of the present invention provides an injection molding similar to that of the first embodiment except that the second embodiment flows the supercritical $CO_2$ as the supercritical fluid and the solute, infiltrates the solute in the resin surface, and then flows a reducer into a space between the resin and the mold.

The second embodiment uses, but is not limited to, $NaBH_4$ for the reducer. The second embodiment puts acetone and $NaBH_4$ in a reducer container 8 whose temperature is controlled at 120° C., and opens the valve V-2 to dissolve them in the supercritical $CO_2$, and introduce the mixture in the mold by opening the valve V-4.

The second embodiment improves the reduction ratio of the Pd complex up to 85% as a result of an analysis of a surface of the article resin-molded by this embodiment in a similar manner to that of the first embodiment. The method of the third embodiment can improve the reduction ratio of the metallic complex at the time of molding, reduce the use amount of the metallic complex as solute, and form a high-quality electroless plated membrane.

Third Embodiment

A third embodiment of the present invention uses for the surface-modification molding similar to that of the first and second embodiments an injection molding apparatus and mold shown in FIG. 2 that shows a schematic block diagram of their principal parts. The third embodiment uses nitrogen as the inert gas to improve the reduction efficiency of the metallic complex used as the solute. When the supercritical $CO_2$ is used as the supercritical fluid, it is preferable to use nitrogen as the inert gas so as to prevent an extraction of the solute. Of course, various gases, such as $CO_2$ and helium, are applicable in addition to nitrogen.

This embodiment uses a decompression valve RV-2 to regulate the pressure of the nitrogen gas from a nitrogen tank (not shown) of 14 MPa to 10 MPa, and then introduces the gas into the heating container 8' via a check valve 21. The heating container 8' has previously experienced an adiabatic processing through welding so that the heat does not transmit to a valve V-4 easily. The temperature of the heating container 8' is set to 300° C.

Just after the supercritical $CO_2$ and the solute are flowed and the solute is infiltrated in the resin surface, the valve V-4 opens and flows the nitrogen in the heating container 8' to a space between the resin and the mold. Other than that, the injection molding of this embodiment is similar to that of the first embodiment.

The third embodiment improves the reduction ratio of the Pd complex up to 80% as a result of an analysis of a surface of the article resin-molded by this embodiment in a similar manner to that of the first embodiment. The method of the third embodiment can improve the reduction ratio of the metallic complex at the time of molding, reduce the use amount of the metallic complex as solute, and form a high-quality electroless plated membrane.

Fourth Embodiment

Figure 3:
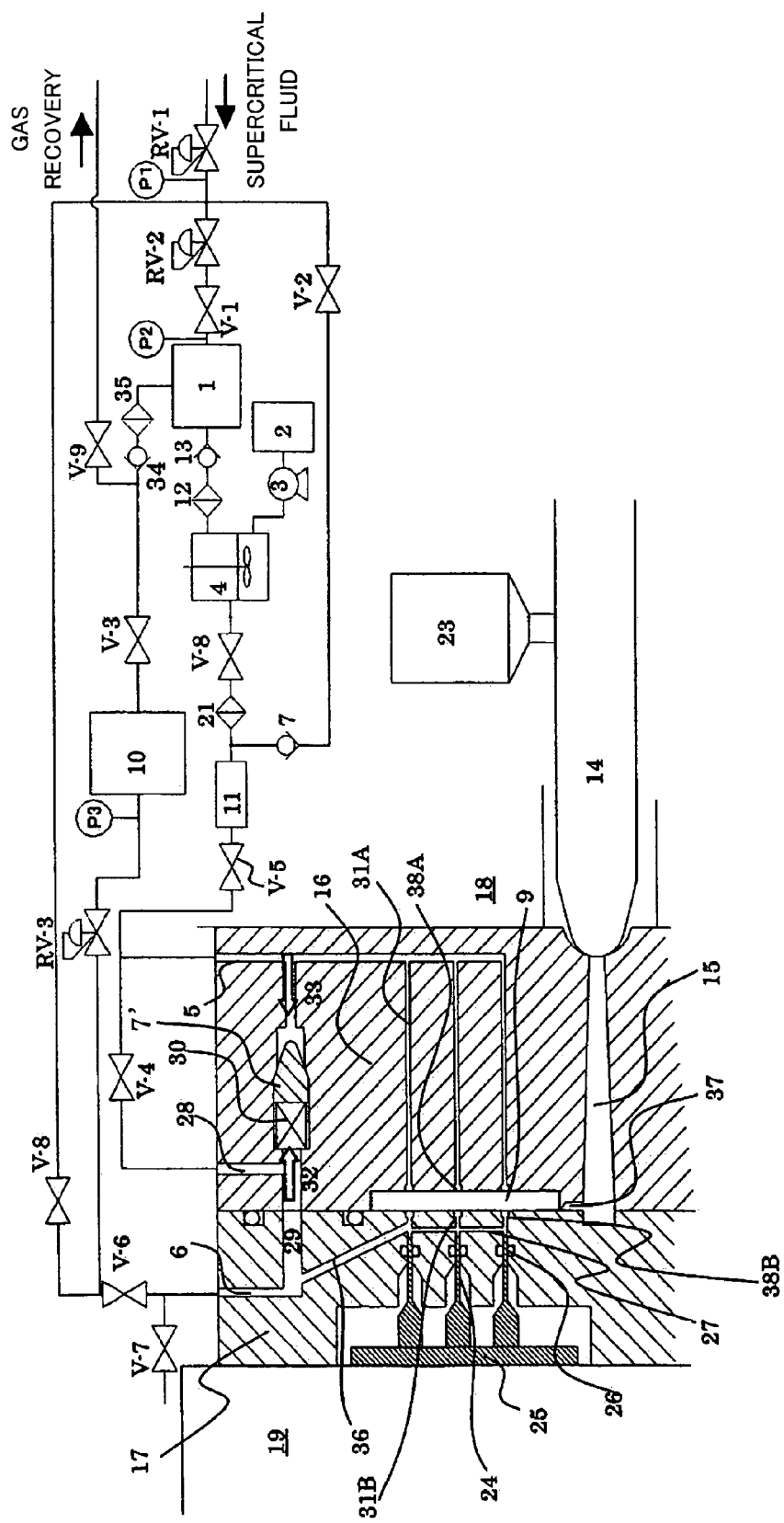
FIG. 3 is a schematic block diagram of principal part of a mold and an injection molding apparatus for implementing an injection molding method according to a fourth embodiment of the present invention.

Referring now to the drawing, a description will be given of a mold and a molding apparatus for implementing a process that recovers from the mold, recycles and continuously uses the surplus solute contained in the supercritical fluid so as to infiltrate the surplus solute into the resin of the present invention. FIG. 3 is a schematic block diagram of principal part of the mold and molding apparatus. In this embodiment, the molding apparatus utilizes a known injection molding apparatus, and provides motorized clamping and injections.

The mold has a fixed mold 16 and a movable mold 17, and the parting line is sealed by an O-ring (not shown). The fixed mold 16 is attached to a fixed platen 18, and the movable mold 17 is attached to a movable platen 19.

The thermoplastic resin in a resin pellet, which is dried and deaerated by a drier (not shown) and automatically supplemented to a hopper 23, is plasticization-metered by a screw (not shown) in a plasticization cylinder 14, and then is filled in the mold cavity 9. A toggle type clamping machine (not shown) arranged behind the movable platen 19 provides clamping. A clamping feedback mechanism can open the parting line with precision of 10 μm as a joint surface between the molds at an arbitrary timing. A type of the supercritical fluid used for the present invention is arbitrary as long as it is a fluid that has solubility to some extent to an organic material, but this embodiment uses the supercritical $CO_2$. A type of solute is arbitrary, but this embodiment uses dimethyl platinum (cyclooctadiene) (II) as Pd complex.

Any method may be used to dissolve the solute in the supercritical fluid, but this embodiment regulates the supercritical $CO_2$ having a temperature of 50° C. and a pressure 25 MPa, supplied from a supercritical fluid generator (not shown), via a decompression valve RV-1 down to 20 MPa and then via a decompression valve RV-2 down to 15 MPa. Then, this embodiment mixes the supercritical $CO_2$ with the metallic complex as solute in the mixing tank 1, and dissolves the metallic complex into the supercritical fluid.

Then, ethanol as an entrainer is agitated with and dissolved in the mixture in the agitator sink 4, after the mixture passes through the check valve 13 and the sintered filter 12. A feedback controller uses a liquid level sensor provided to the agitator sink 4, drives a entrainer pump 3 so that the ethanol is always supersaturated in the agitator sink 4, and supplements the entrainer stored in an entrainer tank 2 to the agitator sink 4.

While the present invention may use any thermoplastic resin, this embodiment uses polycarbonate resin (GE Plastics, Lexan) having a glass transition temperature Tg of 150° C. The resin-molded article and the mold cavity 9 are 30 mm square shaped test pieces. The molding condition of the invention is arbitrary, but this embodiment sets the temperature of the plasticization cylinder 14 to 320° C. and the temperature of the cavity to 100° C. The injection speed is 250 mm/s, and the resin is primarily filled at 0.2 s in a mold cavity 9 having a disc shape with a diameter of Φ120 mm through a spool 15.

While an arbitrary method may be used to introduce the supercritical $CO_2$ and the solute that dissolves in it into the resin surface after the filling in the mold cavity 9, this embodiment uses a release action of an automatic valve V5 that drives the supercritical fluid and solute once filled in a reserve tank 11 using an electromagnetic valve. The supercritical $CO_2$ and solute are introduced to the fixed mold 16 by an introduction port 5 in the fixed mold 16 as a supercritical fluid introducing unit.

In the fixed mold 16, the supercritical $CO_2$ is introduced to a cylindrical introduction concave 38A that contacts the resin and has a diameter of Φ0.5 mm and a depth of 0.2 mm, after passing through an introduction hole 31A that branches from the introduction port 5. Plural grooves (or spaces) (not shown) having a depth of 0.2 mm and a width of 0.1 mm are formed on the mold cavity 9. These grooves are arranged so that they extend in a longitudinal direction (or a direction perpendicular to the paper surface in FIG. 1). The primarily filled resin covers a top surface of the groove that includes the introduction concave 38A, and forms a fine space corresponding to a groove between the resin and the mold cavity 9 in the fixed mold 16.

Similar to the fixed mold 16, the movable mold 17 also forms plural grooves (or spaces) (not shown) having a depth of 0.2 mm and a width 0.1 mm on the mold cavity 9. These grooves include exhaust concaves 38B and are arranged so that they extend in a longitudinal direction (or a direction perpendicular to the paper surface in FIG. 1). The primarily filled resin covers top surfaces of the grooves that includes the exhaust concaves 38B, and forms a fine space corresponding to a groove between the resin and the mold cavity 9 in the movable mold 17. The supercritical $CO_2$ flows through a space formed between the mold cavity 9 and the resin surface and modifies the resin surface. The supercritical $CO_2$ flows through the channel 36 and exhaust port 6 via the exhaust hole 31B connected to the exhaust concave 38B and a connection hole 27 that connects them to each other.

After the resin is filled in the mold cavity 9, the channel for the supercritical $CO_2$ in the fixed and movable molds 16 and 17 are connected to each other by two types of methods: In the first method, a seal valve 7' retreats and a flow is formed from the fixed mold 16 to the bypass channel 29. In this case, the bypass channel 29 has a large sectional area and the fluid seldom flows the introduction hole 31A. In the second method, an ejection pin 24 drives in the exhaust hole 31B, perforates the resin at the molten state, and forms a through-hole in the resin. Plural ejection pins 24 are connected to an ejection plate 25, and the ejection plate 25 moves back and forth towards the fixed mold 16 via a motorized ejector piston (not shown) installed in the molding apparatus. An O-ring 26 seals a space between the ejection pin 24 and the exhaust hole 31B so that the supercritical $CO_2$ does not leak toward the ejection plate 25.

Referring not to FIGS. 4A to 4D, a description will be given of a molding process of the fourth embodiment. FIGS. 4A to 4D are sectional views showing a structure of principal part structure around the mold cavity 9 in the molding apparatus shown in FIG. 3.

The resin 40 at the molten state is injected and filled in the mold cavity 9 under the above molding condition. FIG. 4A shows a state just after the resin is filled. The resin 40 filled in the mold cavity 9 does not transfer the introduction concave 38A and exhaust concave 38B on the mold surface. In other words, the resin 40 is not filled in the grooves (or spaces) that contain the introduction concave 38A and exhaust concave 38B. Just after the injection, a valve V-4 temporarily opens as soon as a valve V-8 and an automatic valve V-5 shown in FIG. 3 open. The supercritical $CO_2$ in which the solute dissolves is introduced from the introduction port 5 and the channel 28, and the pressures 32 and 33 around the seal valve 8 connected to the bypass valve 29 are made equal, as shown in FIG. 4A. The seal valve 8 is forced toward the fixed mold 16 by a spring 30. At this time, as shown in FIG. 4A, the supercritical $CO_2$ and the solute reside around the resin 40.

Thereafter, as shown in FIG. 4B, the ejection pin 24 moves forward, and perforates the resin 40 at the molten state. In this case, the ejection pin 24 pierces the resin and stops without contacting the mold's bottom surface of the introduction concave 38A. Next, the ejection pin 24 retreats, as shown in FIG. 4C, and the through-hole 43 is formed in the resin 40.

A formation of the through-hole 43 enables the supercritical $CO_2$ at the side of the fixed mold 16 to coexist with the supercritical $CO_2$ at the side of the movable mold 17. The valve V-6 opens to recover the supercritical $CO_2$ and the solute in the recovery tank 10. Thereby, a flow of the supercritical $CO_2$ and the solute is formed through the introduction port 5, the introduction hole 31A, the surface-modification groove (or space) that contacts the resin surface, the exhaust hole 31B, and the exhaust port 6. Since the seal valve 8 does not retreat, the flow does not occur in the bypass channel 29.

Intermittent opening and closing of the valve V-6 forms the repetitive flow and residence of the supercritical $CO_2$ for 60 seconds, and selectively infiltrates the organic metallic complex in the resin 40's surface and the through-hole 43. At this time, the valve V-1 does not open, and the pressure P2 in the mixing tank 1 reduces to 13 MPa. The pressure P3 in the recovery tank fluctuates between 3 and 8 MPa.

Then, the valve V-2 opens after the valve V-8 closes so as to introduce the supercritical $CO_2$ that contains no solute and has a pressure P1 of 20 MPa through the check valve 7, the reserve tank 11, and the introduction port 5. Thereby, the pressure balance destroys around the check valve in the mold. The pressure 32 in FIG. 3 is about 15 MPa, whereas the pressure 33 is about 20 MPa. The check valve retreats towards the movable mold 17, and the supercritical $CO_2$ starts flowing in the bypass valve 29 as shown in FIG. 4D.

The supercritical $CO_2$ that contains the solute and resides in the channel in the mold between the bypass channel 29 and the mold cavity 9 is forced toward the mold cavity 9 and infiltrated into the resin 40, as shown in FIG. 4D.

The exhaust and recovery actions continue for 30 seconds. Thereby, the pressure P3 of the recovery tank 10 increases up to 5 to 10 MPa. Then, the valves V-2, V-6 and the automatic valve V-5 close, and the valve V-7 opens so as to release the pressure in the mold cavity 9 to the air. Simultaneously, the valve V-8 opens, the decompression valve RV-3 decompresses the supercritical $CO_2$ having the pressure P1 of 20 MPa down to the pressure P3 of 15 MPa, and the supercritical $CO_2$ is introduced to the recovery tank 10 so as to dissolve again the solute in the recovery tank 10. Thereafter, the clamping pressure increases so as to complete the transfer, and the resin-molded article 10 is cooled for 10 seconds.

Next, the valve V-3 opens and introduces the supercritical $CO_2$ and the solute that dissolves in the recovery tank 10, into the mixing tank 1 at the decompression state via the check valve 34 and the filter 35. The surplus is recovered by a container (not shown) that is released to the air, by opening the valve V-9. Thereafter, the valve V-8 closes, and the valves V-6 and V-7 open so as to release the inside of the recovery tank 10 to the air. This embodiment spends a redissolution time period for the solute in the recovery tank 10, and increases the molding cycle by 20 seconds.

A controller (not shown) controls opening and closing of valves (in particular those V-2, V-3, V-4, V-6 and V-8) in this embodiment. This configuration can maintain the inner pressure in the recovery tank 10 to be a low pressure at the recovery time of the supercritical $CO_2$ and the solute, and internal pressure of the recovery tank 10 to be higher than the internal pressure of the mixing tank 1 at the supply time of the supercritical $CO_2$ and the solute from the recovery tank 10 to the mixing tank 1.

Fifth Embodiment

Figure 5:
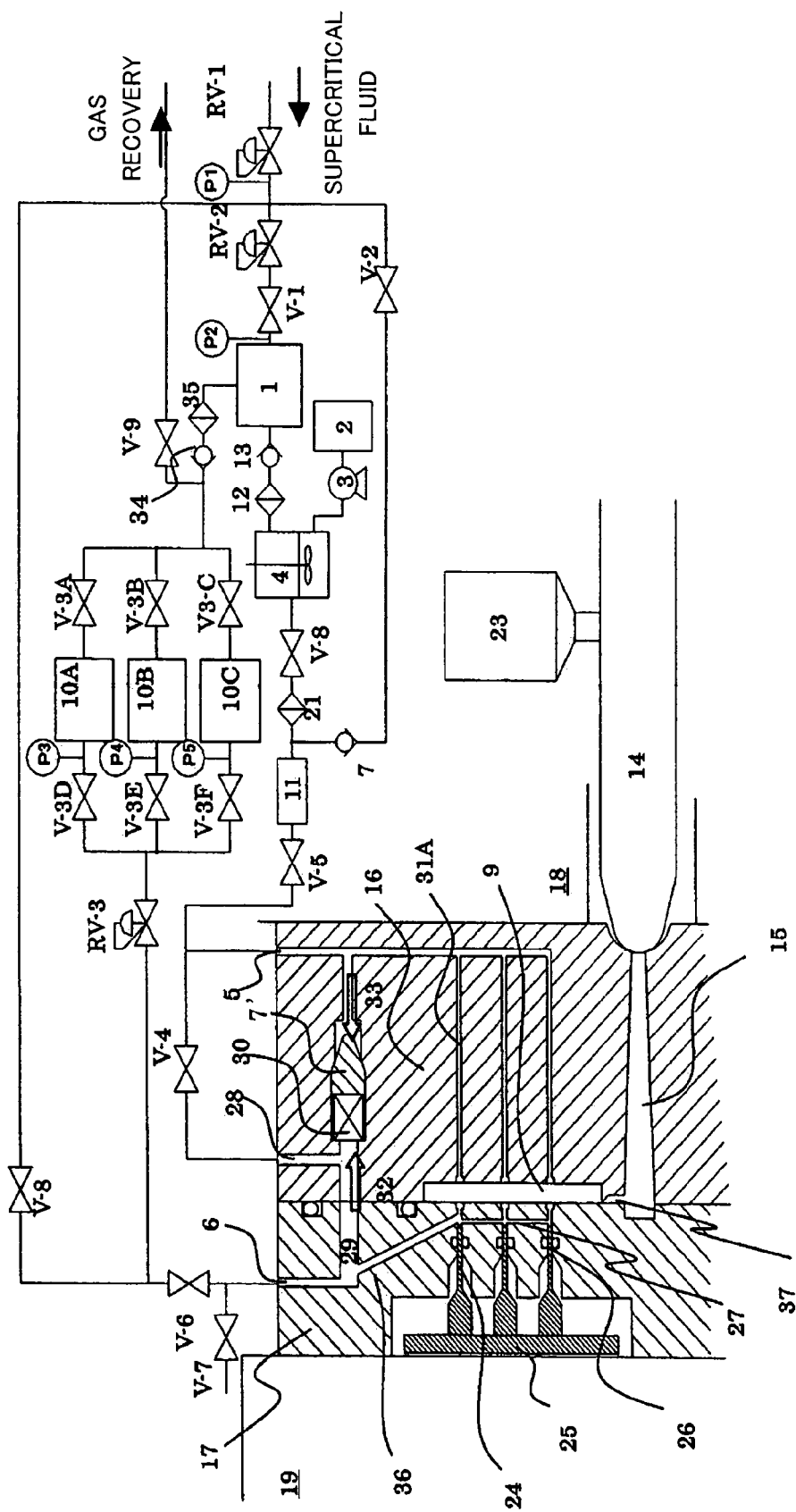
FIG. 5 is a schematic block diagram of principal part of a mold and an injection molding apparatus for implementing an injection molding method according to a fifth embodiment of the present invention.

FIG. 5 is a schematic block diagram of principal part of a mold and an injection molding apparatus for implementing an injection molding method according to a fifth embodiment of the present invention. The fifth embodiment uses a molding apparatus shown in FIG. 5 for an injection molding in a manner similar to the fourth embodiment. This molding apparatus connects plural recovery tanks 10A to 10C to each other in parallel, and activates valves V-3A to V-3F independently. Thereby, this embodiment prevents the redissolution time period of the solute into the supercritical $CO_2$ in the recovery tank from delaying the molding cycle, and improves the throughput of the molding, further than the fourth embodiment.

The present invention provides the resin surface with a high function when the resin surface is modified with the supercritical fluid as a solvent, such as supercritical $CO_2$, in resin molding.

In addition, the present invention can infiltrate the organic metallic complex as a functional agent into the resin surface, disconnects a legand from the metallic complex (in the reduction process), and improves the reduction ratio to precipitate fine metallic particles.

Moreover, the present invention can recover from the mold, recycle and continuously use the surplus solute contained in the supercritical fluid in order to modify the resin surface using the supercritical fluid as a solvent, such as supercritical $CO_2$, and infiltrate the solute in the resin.

Further, the present invention is not limited to these preferred embodiments, and various variations and modifications may be made without departing from the scope of the present invention.

What is claimed is:

1. An injection molding method that modifies a surface of thermoplastic resin using a supercritical fluid that contains a solute, and molds the thermoplastic resin, said injection molding method comprising the steps of:
   injecting and filling the thermoplastic resin into a mold cavity that contains no supercritical fluid;
   forming a space in the mold cavity by moving the mold after said injecting and filling step;
   introducing into the space a first supercritical fluid that contains the solute and a second supercritical fluid that contains no solute simultaneously;
   maintaining the first and second supercritical fluid introduced by the introducing step;
   exhausting from the space the first and second supercritical fluid after said maintaining step; and
   repeating said introducing step, said maintaining step and said exhausting step.

2. The injection molding method according to claim 1, wherein the solute is an organic metallic complex.

3. The injection molding method according to claim 1, further comprising the steps of:
   recovering the first supercritical fluid that contains the solute, which has been exhausted by said exhausting step; and
   recycling the first supercritical fluid that contains the solute, which has been recovered, for said introducing step.

4. The injection molding method according to claim 2, further comprising the step of reducing the organic metallic complex in the space.

5. The injection molding method according to claim 4, wherein said reducing step introduces into the space inert gas having a temperature higher than a reduction temperature of the organic metallic complex.

6. The injection molding method according to claim 5, wherein the inert gas is nitrogen.

7. The injection molding method according to claim 4, wherein said reducing step introduces into the space supercritical fluid that contains a reducer for reducing the organic metallic complex.

* * * * *